US009926389B2

(12) United States Patent
Zimmerman et al.

(10) Patent No.: US 9,926,389 B2
(45) Date of Patent: Mar. 27, 2018

(54) MOLDING A BED PLATE AND ITS USE

(71) Applicant: NOVA Chemicals (International) S.A., Fribourg (CH)

(72) Inventors: Veronica Rose Zimmerman, Calgary (CA); Robert Kevin McBrien, Calgary (CA); Robert Joseph Louis Quaiaittini, Calgary (CA); Victoria Ker, Calgary (CA); Yan Jiang, Calgary (CA)

(73) Assignee: NOVA Chemicals (International) S.A., Fribourg (CH)

(*) Notice: Subject to any disclaimer, the term of this patent is extended or adjusted under 35 U.S.C. 154(b) by 0 days.

(21) Appl. No.: 15/146,067

(22) Filed: May 4, 2016

(65) Prior Publication Data
US 2016/0333120 A1  Nov. 17, 2016

(30) Foreign Application Priority Data

May 13, 2015  (CA) ...................................... 2891002

(51) Int. Cl.
| | |
|---|---|
| *B01J 8/44* | (2006.01) |
| *C08F 10/02* | (2006.01) |
| *C08F 10/00* | (2006.01) |
| *B01J 8/18* | (2006.01) |
| *B01J 8/00* | (2006.01) |

(52) U.S. Cl.
CPC ................ *C08F 10/02* (2013.01); *B01J 8/44* (2013.01); *C08F 10/00* (2013.01); *B01J 8/001* (2013.01); *B01J 8/1827* (2013.01); *B01J 2208/00265* (2013.01); *B01J 2208/00725* (2013.01); *B01J 2208/00884* (2013.01)

(58) Field of Classification Search
CPC .......................................................... B01J 8/44
USPC .................................................. 422/139, 143
See application file for complete search history.

(56) References Cited

U.S. PATENT DOCUMENTS

| | | | |
|---|---|---|---|
| 2,825,721 A | 3/1958 | Hogan et al. | |
| 3,023,203 A | 2/1962 | Dye | |
| 3,404,845 A * | 10/1968 | Schmeling ................. | B01J 8/44 134/182 |
| 3,622,251 A | 11/1971 | Allen | |
| 3,704,287 A | 11/1972 | Johnson | |
| 3,711,956 A * | 1/1973 | Brauer ....................... | B01J 8/28 34/364 |
| 3,914,089 A * | 10/1975 | Desty ........................ | B01J 8/44 34/585 |
| 4,011,382 A | 3/1977 | Levine et al. | |
| 4,100,105 A | 7/1978 | Levine et al. | |

(Continued)

OTHER PUBLICATIONS

Guardani, R.; Teixeira, A.C.S.C.; Casella, E.L.; Souza, A.M.F.I. Braz. J. Chem. Eng. Sep. 1998, 15(3).*

(Continued)

*Primary Examiner* — Rip A Lee
(74) *Attorney, Agent, or Firm* — Julie L. Heinrich

(57) ABSTRACT

A fluid dynamic model having at least 5,000,000 cells of the portion of a gas phase reactor from the exit of the condenser to a half a reactor diameter above the bed plate is useful in determining the design of the bottom surface or support structure for a bed plate to minimize liquid pooling below and above the bed plate when operating in condensing mode.

6 Claims, 4 Drawing Sheets

(56) References Cited

U.S. PATENT DOCUMENTS

| | | | |
|---|---|---|---|
| 4,251,926 A * | 2/1981 | Bagley | F26B 3/082 34/577 |
| 4,543,399 A | 9/1985 | Jenkins, III et al. | |
| 4,588,790 A * | 5/1986 | Jenkins, III | B01J 8/1809 526/70 |
| 4,719,193 A | 1/1988 | Levine et al. | |
| 4,764,347 A * | 8/1988 | Milligan | B01J 8/1827 422/113 |
| 5,183,641 A * | 2/1993 | Isaksson | F23C 10/20 110/229 |
| 5,352,749 A | 10/1994 | DeChellis et al. | |
| 5,405,922 A | 4/1995 | DeChellis et al. | |
| 5,434,116 A | 7/1995 | Sone et al. | |
| 5,436,304 A | 7/1995 | Griffin et al. | |
| 5,462,999 A | 10/1995 | Griffin et al. | |
| 5,554,775 A | 9/1996 | Krishnamurti et al. | |
| 5,637,659 A | 6/1997 | Krishnamurti et al. | |
| 5,753,191 A * | 5/1998 | Yamamoto | B01J 8/24 422/143 |
| 5,885,534 A * | 3/1999 | Reynolds | B01F 5/0475 422/140 |
| 5,972,224 A * | 10/1999 | Hotier | B01D 15/1828 210/198.2 |
| 6,113,862 A * | 9/2000 | Jorgensen | B01J 8/1872 422/139 |
| 6,255,411 B1 | 7/2001 | Hartley et al. | |
| 6,399,843 B1 * | 6/2002 | Koves | C07C 2/08 585/510 |
| 6,723,291 B1 * | 4/2004 | Wu | B01J 8/1827 239/504 |
| 7,446,156 B2 | 11/2008 | Dooley | |
| 7,601,303 B1 * | 10/2009 | Karer | B01J 8/1827 422/139 |
| 7,619,011 B1 * | 11/2009 | Gamwo | B01J 8/1836 518/700 |
| 9,315,406 B2 * | 4/2016 | Strano | C02F 9/00 |
| 2005/0255009 A1 * | 11/2005 | Davis | B01J 8/1827 422/131 |
| 2007/0217966 A1 * | 9/2007 | Heino | B01J 8/1827 422/143 |
| 2008/0107570 A1 * | 5/2008 | Hansen | B01J 2/16 422/105 |
| 2009/0118443 A1 * | 5/2009 | Stavens | B01J 8/1818 526/62 |
| 2010/0071770 A1 * | 3/2010 | Keggenhoff | B01D 3/008 137/1 |
| 2010/0080741 A1 * | 4/2010 | Couch | B01J 29/90 422/219 |
| 2010/0292416 A1 * | 11/2010 | De Chellis | B01J 8/1872 526/69 |
| 2011/0197467 A1 * | 8/2011 | Stanke | B01J 8/44 34/582 |
| 2011/0206563 A1 * | 8/2011 | Wyatt, Jr. | B01J 8/125 422/145 |
| 2011/0315603 A1 * | 12/2011 | Skoulidas | B01J 8/0055 208/113 |
| 2012/0103869 A1 * | 5/2012 | Castagnos, Jr. | B01J 4/002 208/106 |
| 2014/0186225 A1 * | 7/2014 | Sprague | B01J 8/1872 422/143 |
| 2014/0360919 A1 * | 12/2014 | Le Coz | B01D 3/007 208/108 |

OTHER PUBLICATIONS

Peri, J.B. and Hensley, A.L., Jr.; The Surface Structure of Silica Gel; The Journal of Physical Chemistry; vol. 72, No. 8, Aug. 1968, pp. 2926-2933.

Noshay, A. and Karol, F.J.; Transition Metal Catalyzed Polymerization—Ziegler-Natta and Metathesis Polymerizations; Chemical Activation of Silica Supports for Chromocene-Based Polyethylene Catalysts; Cambridge University Press; 6th Edition; 1988, pp. 396-416.

* cited by examiner

MOLDING A BED PLATE AND ITS USE

FIELD OF THE INVENTION

The present invention relates to the design and use of a bed plate in a fluidized bed gas phase polymerization reactor. More particularly the present invention relates to the design and use of a bed plate in the presence of a high activity catalyst and a liquid phase.

BACKGROUND OF THE INVENTION

The fluidized bed gas phase polymerization technology was developed by Union Carbide in the mid 1970's. In the condensed mode process a gas comprising monomers, a ballast gas, and a condensable liquid is circulated through a bed of reactive catalyst in the reactor, through a disengagement zone at the top of the reactor (i.e. the expanded upper section of the reactor) where entrained polymer particles drop back into the bed, through a recycle line including a compressor, and a condenser where some of the components in the gas phase may be liquefied, and back to the bottom of the reactor. The recycle stream enters the bottom of the reactor through a deflector plate. In theory the stream is evenly distributed by passing through a bed plate and into the reactor. However, the flow pattern below the bed plate is quite complex due to the presence of a jet created by the recycle gas pipe flow. In practice the distribution may be uneven resulting in one section or the bed having more condensed phase than another. In some older reactors the product discharge port may be quite close to the bed plate. If there is an uneven distribution of liquids within the bed the discharge port may be flooded with liquid. Also an uneven distribution of liquids within the bed may result in "mud" and potentially sheeting.

U.S. Pat. Nos. 4,543,399 and 4,588,790 issued to Jenkins, III et al. Sep. 24, 1985 and May 13, 1986, respectively, assigned to Union Carbide Corporation teach incorporating into the feed stream up to about 20 weight % of the recycle stream of a condensable gas i.e., a gas which condenses or at least partially condenses to liquid when passed through a heat exchanger prior to being recycled back to the reactor sometimes also referred to as an Induced Condensing Agent). Typically these gases are $C_{4-6}$ alkanes, preferably isomers of pentane and hexane.

U.S. Pat. Nos. 5,462,999 and 5,436,304 to Griffin et al. issued Oct. 31, 1995 and Jul. 25, 1995, respectively, and U.S. Pat. Nos. 5,405,922 and 5,352,749 to DeChellis et al. issued Apr. 11, 1995 and Oct. 4, 1994, respectively, all assigned to Exxon Chemical Patents, Inc. all teach operating a gas phase polymerization where in the feed stream may contain from about 17.5 up to 50 weight % of a condensable gas.

There are a number of United States patents in the name of Rhee et al. assigned to Union Carbide Corporation. These patents disclose deflector plates which may be annular (see FIG. 2 A of U.S. Pat. No. 4,933,149) for use in fluidized bed gas phase reactors operated in condensing mode. The deflector plate is in the bottom of the reactor above and proximate to the reactor inlet. From the example the distributor plate or bed plate is 2.54−0.10=2.44 meters (about 7.9 feet) above the upper surface of the deflector plate. The volume of the reactor below the bed plate is referred to as the mixing chamber (Col. 3 lines 40-45). The annular deflector plate divides the incoming gas stream into a central upward flow and a flow directed to the side walls to "sweep" the wall of the mixing chamber (Col. 4 lines 1-5) reduce filming on the reactor wall in the mixing zone and also to re-entrain any liquids which have separated from the gas stream (Col. 9 line 65-Col. 10 line 10). Below the bed plate is a screen 27 to reduce the likelihood of the bed plate becoming plugged by resin chips impinging on the plate as the recycle stream carries chips upwards (Col. 9 line 52; Col. 10 lines 60-66; and Col. 11 lines 39-43).

Interestingly in FIG. 2 there appear to be some un-described elements beneath the bed plate. This structure is not described anywhere in the patent application.

U.S. Pat. No. 6,723,291 issued Apr. 20, 2004 to Wu, assigned to China Petrochemical Corporation and Tianjin United Chemicals Corporation, disclosed a deflector plate wherein the annular opening of the deflector plate of U.S. Pat. No. 4,933,149 has an inverted truncated open cone placed over it. This divides the incoming gas into three segments. This improves the flow of gases in the mixing chamber overcoming some disadvantages of the distributor plate of Rhee. The distributor plate can be used in condensed more of operation containing up to 25 wt. % of liquids.

Interestingly the screen and the unidentified structures dependent from the bed plate have been eliminated.

U.S. Pat. No. 7,446,156 issued Nov. 4, 2008 to Dooley assigned to Westlake describes without drawings by reference to a provisional application "swirling" the bed of particles in the reactor to reduce sheeting.

While the figures in the prior art show a uniform circulating flow pattern through the mixing zone the flow may in fact be non uniform in three dimensions. This is particularly the case if the central upward gas flow of the mixing chamber impinging on the bottom of the bed plate sees a "raceway" or an unimpeded direction of flow. The result is that the raceway preferentially directs the flow in some areas beneath the bed plate and not to other areas causing secondary or tertiary flow patterns. The flow along a raceway across the bottom of the bed plate extends to the outer edge of the bed plate, where it redirects and collides with a portion of upward flow from the distributor plate resulting in an increased flow of gas and liquids in that peripheral area of the bed plate. This results in liquid flooding of the bed of polymer particles above the area of higher concentration of liquid droplets. The situation is exacerbated in some reactor designs where the outlet for the polymer is less than roughly half a diameter of the bed plate above the bed plate. This may result in the product discharge system becoming flooded with condensed liquids.

The present invention seeks to improve product quality (e.g. polydispersity, CDBI, etc.), and reduce reactor bed flooding, product discharge flooding and sheet formation by eliminating raceways on the bottom surface of the bed plate.

SUMMARY OF THE INVENTION

In one embodiment, the present invention provides a grid supporting a circular bed plate for a gas phase polymerization reactor having a fluidized bed of polymeric particles, a discharge port within half the diameter of the bed plate above the bed plate, said grid comprising a series of vertical baffles traversing the underside of the bed plate dividing the area below the bed plate into a series of cells so that from below the grid an upwardly directed jet comprising monomers, ballast gas and from 3 to 40 weight % of dispersed condensed hydrocarbons having a velocity sufficient to fluidize the bed, does not experience a raceway across the bed plate, and the gas phase, and the condensed phase are substantially (e.g. at least 80%) homogeneously distributed over not less than 80% of the area of the available flow path through the bed plate.

In a further embodiment, the cells are contiguous and located around the center point of the bed plate.

In a further embodiment, the cells are straight walled (e.g. triangular, trapezoidal, hexagonal) except where the baffles meet the reactor wall; wherein that portion of the wall of the cell is an arc having the radius of curvature of the reactor wall.

In a further embodiment, the cells are diamond shaped.

In a further embodiment, there is provided a method of operating a fluidized bed reactor in condensed mode having in cooperating arrangement a bed plate and a grid of a fixed design as above comprising on a computer:

i. modeling the operation of the reactor including:
a) building a three dimensional model of the reactor from outlet of the heat exchanger to the top of the lowest discharge port, including the deflector plate, the bed plate having descending vertical baffles and a fluid zone representing the fluidized bed of polymer particles between the discharge port and the bed plate (hereinafter the modeled section of the reactor), and modeling the gas and liquid phase using Computational Fluid Dynamics software;
b) dividing the model into not less than 5,000,000 cells;
c) modeling the flow of a gas at a temperature from 25° C. to 120° C. and a pressure from 1700 kPa (250 psi) to 3445 kPa (500 Psi) comprising monomers, ballast gas and from 3 to 40 wt. % of one or more condensed liquids having a density from 0.60 g/cc to 0.70 g/cc and an inlet normal droplet distribution from 25 to 500 microns through the modeled section of the reactor at a flow rate sufficient to fluidize the bed (typically at a flow rate from 0.4 to 5 ft. per second);
d) optionally modeling liquid film formation on zones where the gas and liquid impinge on mechanical components of the reactor including walls, leading to formation of larger or smaller droplets.

ii. determining one or more of:
e) the flow pattern of the gas and liquid below the bed plate;
f) the change in the particle size distribution of the liquid phase due to impingement of the gas on mechanical components of the reactor including one or more of: filming formation, film stripping, turbulent breakup of droplets, and droplet coalescence due to the flow patterns arising from the vertical baffles;
g) the flow pattern above the bed plate of gas, liquid(s) and polymer particles up to a distance of one half the diameter of the bed plate;
h) the height above the bed plate at which 80% of the droplets have evaporated;
i) the distribution of droplet size above the bed plate;
j) the propensity for liquid pooling above the bed plate; and iii. iteratively repeating step 2) for different flow rates but the same composition of the inlet gas and liquid loading and recording the results;

iv. comparing the results from step 3) to determine operating conditions at which the liquid(s) flow through the distributor plate and without biasing liquids across, either below or immediately above, the bed plate.

In a further embodiment, the process further comprises iteratively varying one or more of the composition of the inlet gas, the composition of the liquid and the loading of the liquid in the inlet gas; and a) storing the calculated results; and
b) comparing the stored results to determine one or more of a preferred composition of the gas phase; the composition of the liquid and the loading of the liquid in the gas phase.

In a further embodiment, the process further comprises iteratively varying one or more of the design of the bed plate and the design of the grid; and a) storing the calculated results; and
b) comparing the stored results to determine one or more of a preferred design for the bed plate and a design for the grid.

In a further embodiment, the gas phase monomers comprise not less than 70 wt. % ethylene and up to 30 wt. % of one or more $C_{4-8}$ alpha olefins.

In a further embodiment, the induced condensing agent is present in an amount to provide from 3 to 40 wt. % of liquids based on the weight of the recycle gas flow at the reactor inlet and comprises a non polymerizable hydrocarbon or fluorocarbon.

In a further embodiment, the operating conditions for the reactor are at a temperature from 75° C. to 110° C. and a pressure from 1800 kPa (260 psi) to 2400 kPa (350 psi).

DETAILED DESCRIPTION

Number Ranges

Figure 1:
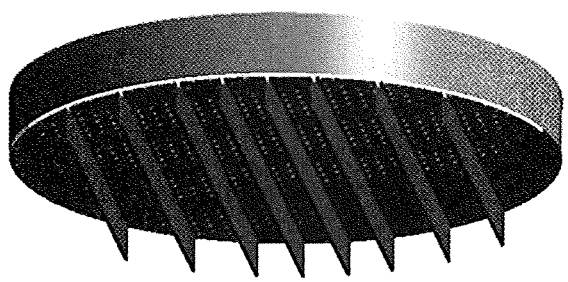
FIG. 1 is a schematic diagram of an inlet and a bed plate with a number of parallel raceways.
Figure 1:
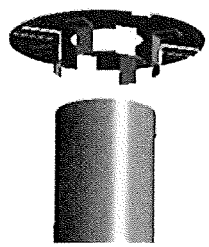
Figure 2:
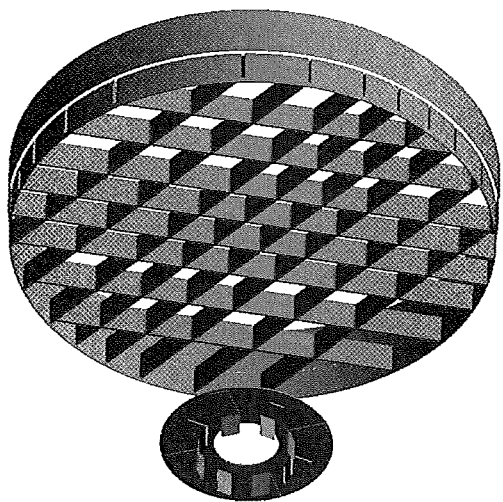
FIG. 2 is a schematic diagram of the bottom side of a bed plate designed in accordance with the present invention.

Other than in the operating examples or where otherwise indicated, all numbers or expressions referring to quantities of ingredients, reaction conditions, etc. used in the specification and claims are to be understood as modified in all instances by the term "about". Accordingly, unless indicated to the contrary, the numerical parameters set forth in the following specification and attached claims are approximations that can vary depending upon the properties that the present invention desires to obtain. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical values, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

All compositional ranges expressed herein are limited in total to and do not exceed 100 percent (volume percent or weight percent) in practice. Where multiple components can be present in a composition, the sum of the maximum amounts of each component can exceed 100 percent, with the understanding that, and as those skilled in the art readily understand, the amounts of the components actually used will conform to the maximum of 100 percent.

Gas Phase Polymerization

References to pressures herein are absolute values.

References to the available flow path through the bed plate refers to the cross sectional area of the bed plate holes that is perpendicular to the mean flow path.

Fluidized bed gas phase polymerization is well known in the art as noted in above mentioned U.S. Pat. Nos. 4,543, 399; 4,588,790; 5,462,999; and 5,436,304.

Fluidized bed gas phase reactors to make polyethylene are generally operated at temperatures from about 50° C. up to about 125° C. (provided the sticking temperature of the polymer is not exceeded) preferably from about 75° C. to about 110° C. and at pressures typically not exceeding 3,447 kPa (about 500 psi) preferably not greater than about 2,414 kPa (about 350 psi) most preferably from about 689.7 kPa (about 100 psi) to about 2,414 kPa (about 350 psi).

In the reactor, the gas phase typically comprises the monomers, a balance (or ballast) gas such as nitrogen, possibly a molecular weight control agent such as hydrogen and in the process of the present invention an induced condensing agent ("ICA") typically a condensable alkane (i.e., condensing mode such as disclosed in U.S. Pat. No. 4,543,399 issued Sep. 24, 1985 to Jenkins III et al.; U.S. Pat. No. 4,588,790 issued May 15, 1986 to Jenkins III et al. and the so-called super condensing mode as disclosed in U.S. Pat. No. 5,352,749 issued Oct. 4, 1994 to DeChellis et al., assigned to Exxon Chemical Patents, Inc. and U.S. Pat. No. 5,436,304 issued Jul. 25, 1995 to Griffin et al., assigned to Exxon Chemical Patents, Inc.).

The process of the present invention is operated in "condensing mode". The gas stream comprises an induced condensing agent (ICA) present in an amount to provide from 3 to 40 wt. % of liquids based on the weight of the recycle gas flow at the inlet to the reactor and comprises a non polymerizable hydrocarbon or fluorocarbon, (e.g., propane, butane, pentane, isopentane, hexane 1,1,1,3,3,3-hexafluoropropane, 1,1,1,2-tetrafluoroethane, 1,1,1,3,3-pentafluoropropane, 1,1,1,3,3-pentafluorobutane, octafluorocyclobutane, and 2,3-dihydrodecafluoropentane). It should be noted the liquid phase comprises at least some of the ICA and may also comprise some of the monomers having a relatively low dew point. Accordingly, the process comprises recovering recycle feed stream from the reactor and optionally from the polymer recovery system (such as for example the polymer recovery system as described in U.S. Pat. No. 6,255,411 issued Jul. 3, 2001 to Hartley et al., assigned to Union Carbide Chemicals and Plastics Technology Corporation, the text of which is hereby incorporated by reference) and compressing the recycle stream and passing the resulting compressed recycle stream through a heat exchanger to condense that portion of the recycle stream condensable at temperatures (e.g., from 20° C. to 60° C.) and the pressures of the heat exchanger. Droplet formation begins in the heat exchanger. It is important to model the evolving change in droplet size and distribution from the exit of the heat exchanger to the top of the lowest product discharge vent in the reactor to properly model liquid separation, film formation, and droplet size evolution etc., as the liquid and recycle stream pass through the end of the recycle line, the deflector plate, the bed plate and into the bed of growing polymer particles. The velocity of the gas passing through the bed must be sufficient to fluidize the bed. The condensed phase then evaporates in the fluidized bed to control the temperature within the bed. The per pass conversion of monomer in the feed stream is low, typically less than 10%, generally less than 5%, usually less than about 3%.

The polymer is removed from the reactor through a series of ports in the region of the fluidized bed in the reactor for example as described in U.S. Pat. No. 6,255,411 issued Jul. 3, 2001 to Hartley et al., assigned to Union Carbide Chemicals and Plastics Technology Corporation, The monomers comprise ethylene and optionally from 0 up to 20 generally about 0.5 to 16 preferably from 2 to 13, most preferably from 5 to 13 weight % (based on the monomers) of a copolymerizable $C_{3-8}$, preferably $C_{4-6}$, alpha olefin. Copolymerizable olefins include butene (1-butene), 4-methyl-1-pentene, hexene (1-hexene) and octene (1-octene), although it may be difficult to keep significant amounts of octene in the gas phase. The polymer may have a density from 0.905 to 0.960 g/cc.

The gas phase may also comprise a ballast gas such as nitrogen and a chain transfer agent such as hydrogen.

The Support

The catalyst is a supported catalyst.

The support for the catalyst typically comprises an inorganic substrate usually of alumina or silica having a pendant reactive moiety. The reactive moiety may be a siloxy radical or more typically is a hydroxyl radical. The preferred support is silica. The support should have an average particle size from about 10 to 150 microns, preferably from about 20 to 100 microns. The support should have a large surface area typically greater than about 100 $m^2/g$, preferably greater than about 250 $m^2/g$, most preferably from 300 $m^2/g$ to 1,000 $m^2/g$. The support will be porous and will have a pore volume from about 0.3 to 5.0 ml/g, typically from 0.5 to 3.0 ml/g. Supports which are specifically designed to be an agglomeration of sub-particles, while useful, are not required.

It is important that the support be dried prior to the initial reaction with an aluminum compound. Generally, the support may be heated at a temperature of at least 200° C. for up to 24 hours, typically at a temperature from 500° C. to 800° C. for about 2 to 20 hours. The resulting support will be free of adsorbed water and should have a surface hydroxyl content from about 0.1 to 5 mmol/g of support, preferably from 0.5 to 3 mmol/g.

A silica suitable for use in the present invention has a high surface area is amorphous silica (surface area of 300 $m^2/gm$; pore volume of 1.65 $cm^3$ per gram). For example, commercially available silicas are marketed under the trademark of Davison® 958 and Davison® 955 by the Davison Chemical Division of W. R. Grace and Company.

The amount of the hydroxyl groups in silica may be determined according to the method disclosed by J. B. Peri and A. L. Hensley, Jr., in J. Phys. Chem., 72 (8), 2926 (1968), the entire contents of which are incorporated herein by reference.

While heating is the most preferred means of removing OH groups inherently present in many carriers, such as silica, the OH groups may also be removed by other removal means, such as chemical means. For example, a desired proportion of OH groups may be reacted with a suitable chemical agent, such as a hydroxyl reactive aluminum compound (e.g., triethyl aluminum) or a silane compound. This method of treatment has been disclosed in the literature and two relevant examples are: U.S. Pat. No. 4,719,193 to Levine in 1988 and by Noshay A. and Karol F. J. in Transition Metal Catalyzed Polymerizations, Ed. R. Quirk, 396, 1989. For example, the support may be treated with an aluminum compound of the formula $Al((O)_a R^1)_b X_{3-b}$, wherein a is either 0 or 1, b is an integer from 1 to 3, $R_1$ and X are as defined below. The aluminum content on the support is included in the ratio of Al:Ti in the catalyst. The amount of aluminum compound is such that the amount of aluminum on the support will be from about 0.5 to 2.5 weight % based on the weight of the support.

Ziegler Natta Catalysts

Some Ziegler-Natta catalyst useful in accordance with the present invention will comprise an aluminum compound of the formula $R^1_b Al(OR^1)_a X_{3-(a+b)}$ wherein a is an integer from 0 to 3, typically 0 or 1, b is an integer from 0 to 3 and the sum of a+b is from 0 to 3, each $R^1$ is independently selected from the group consisting of (the same or different) $C_{1-10}$ alkyl radical and X is a chlorine atom; a titanium compound of the formula $Ti(OR^2)_c X_d$ wherein each $R^2$ is independently selected from the group consisting of a $C_{1-4}$ alkyl radical, a $C_{6-10}$ aromatic radical, X is selected from the group consisting of a chlorine atom and a bromine atom, c is 0 or an integer up to 4 and d is 0 or an integer up to 4 and the sum of c+d is the valence of the Ti atom; a magnesium compound of the formula $(R^5)_e MgX_{2-e}$ wherein each $R^5$ is independently selected from the group consisting of $C_{1-8}$ alkyl radical and e is 1 or 2; a reactive organic halide selected from the group consisting of $CCl_4$ and $C_{1-6}$ alkyl halides preferably $C_{3-6}$ secondary and tertiary alkyl halides, preferably chlorides or a mixture thereof and optionally an electron donor, to provide a molar ratio of total Al to Ti (e.g., the first and second aluminum additions $Al^1$ and $Al^2$ typically from 0 to 70 weight % of the aluminum compound is used to treat the support and the remaining aluminum is added at some time during the rest of the catalyst synthesis) from 2:1 to 15:1; a molar ratio of Al from the second aluminum ($Al^2$) addition to Ti from 1:1 to 8:1; a molar ratio of Mg:Ti from 1:1 to 20:1, preferably 2:1 to 12:1; a molar ratio of active halide (this excludes the halide from the Al and Ti compounds if present) from the $CCl_4$ or $C_{1-6}$ preferably $C_{3-6}$ alkyl halide or mixtures thereof to Mg from 1:1 to 6:1, preferably 1.5:1 to 5:1; and a molar ratio of electron donor to Ti from 0:1 to 18:1, preferably from 0.5:1 to 15:1. Generally, the titanium is present in the catalyst in an amount from 0.20 to 3.0 weight % inclusive of the support.

Typically, the catalyst components are reacted in an organic medium such as an inert $C_{5-10}$ hydrocarbon that may be unsubstituted or is substituted by a $C_{1-4}$ alkyl radical. Some solvents include pentane, isopentane, hexane, isohexane, heptane, octane, cyclohexane, methyl cyclohexane, hydrogenated naphtha and ISOPAR®E (a solvent available from Exxon Chemical Company) and mixtures thereof.

Typically, the aluminum compounds useful in the formation of the catalyst or catalyst precursor in accordance with the present invention have the formula $R^1_b Al(OR^1)_a X_{3-(a+b)}$ wherein a is an integer from 0 to 3, preferably 0 or 1, b is an integer from 0 to 3 preferably 2 or 3 most preferably 3, and the sum of a+b is from 0 to 3 preferably 3, each $R_1$ is independently selected from the group consisting of (the same or different) $C_{1-10}$, preferably $C_{1-8}$ alkyl radicals and X is a halogen atom preferably a chlorine atom. Suitable aluminum compounds include trimethyl aluminum (TMA), triethyl aluminum (TEAL), diethyl aluminum ethoxide, diisobutyl aluminum ethoxide, isoprenyl aluminum, triisobutyl aluminum (TiBAL), diethyl aluminum chloride (DEAC), tri-n-hexyl aluminum (TnHAl), tri-n-octyl aluminum (TnOAl), and mixtures thereof. The aluminum compounds containing a halide may be an aluminum sesquihalide. Preferably, in the aluminum compound, a is 0, b is 3 and $R_1$ is a $C_{1-8}$ alkyl radical.

The magnesium compound may be a compound of the formula $(R^5)MgX_{2-e}$ wherein each $R^5$ is independently selected from the group consisting of $C_{1-8}$ alkyl radicals and e is 1 or 2. Some commercially available magnesium compounds include magnesium chloride, butyl octyl magnesium, dibutyl magnesium and butyl ethyl magnesium. If the magnesium compound is soluble in the organic solvent it may be used in conjunction with a $C_{3-6}$ halogenating agent or reactive organic halide to form magnesium halide (i.e., $MgX_2$ where X is a halogen preferably chlorine or bromine, most preferably chlorine), which precipitates from the solution (potentially forming a substrate for the Ti compound).

Some halogenating agents (e.g., reactive organic halides) include $CCl_4$ or one or more alkyl halides, preferably chlorides, of the formula $R^6 Cl$ wherein $R^6$ is selected from the group consisting of $C_{1-6}$ alkyl radicals preferably secondary and tertiary $C_{3-6}$ alkyl radicals. Suitable chlorides include sec-butyl chloride, t-butyl chloride and sec-propyl chloride. The reactive halide is added to the catalyst in a quantity such that the molar ratio of active halide (e.g., chloride from the reactive organic halide):Mg should be from 1:1 to 6:1, preferably from 1.5:1 to 5:1, more preferably from 1.5:1 to 3:1 and most preferred from 1.9:1 to 3:1.

The titanium compound in the catalyst has the formula $Ti(OR^2)_c X_d$ wherein each $R^2$ is independently selected from the group consisting of a $C_{1-4}$ alkyl radical, and a $C_{6-10}$ aromatic radical, X is selected from the group consisting of a chlorine atom and a bromine atom preferably chlorine, c is 0 or an integer up to 4 and d is 0 or an integer up to 4 and the sum of c+d is the valence of the Ti atom. The titanium compound may be selected from the group consisting of $TiCl_3$, $TiCl_4$, $Ti(OC_4H_9)_4$, $Ti(OC_3H_7)_4$, and $Ti(OC_4H_9)Cl_3$. Most preferably the titanium compound is selected from the group consisting of $Ti(OC_4H_9)_4$, $Ti(OC_3H_7)_4$, and $TiCl_4$ and mixtures thereof. Generally, the titanium in the catalyst or catalyst precursor is present in an amount from 0.20 to 3, preferably from 0.20 to 1.5, most preferably from 0.25 to 1.0 weight % based on the final weight of the catalyst (including the support).

As noted above, an electron donor may be and in fact is preferably used in the catalysts or catalysts precursor used in accordance with the present invention. The electron donor may be selected from the group consisting of $C_{3-18}$ linear or cyclic aliphatic or aromatic ethers, ketones, esters, aldehydes, amides, nitrites, amines, phosphines or siloxanes. Preferably, the electron donor is selected from the group consisting of diethyl ether, triethyl amine, 1,4-dioxane, tetrahydrofuran, acetone, ethyl acetate, and cyclohexanone and mixtures thereof. The electron donor when present may be used in a molar ratio to the titanium from 0.5:1 to 18:1 preferably in a molar ratio to Ti from 1:1 to 15:1, most preferably from 2:1 to 12:1.

In the catalyst or catalyst precursor the molar ratio of Mg:Ti may be from 1:1 to 20:1, preferably from 2:1 to 12:1, most preferably from 3:1 to 10:1. The molar ratio of second aluminum ($A^2$) to titanium in the catalyst may be from 1:1 to 8:1, preferably from 1.5:1 to 7:1, most preferably from 2:1 to 6:1. Generally, from 0 to not more than about 70 weight %, preferably from 10 to 60 weight %, of the aluminum (compound in the catalyst) may be used to treat the support (e.g., $Al^1$). The molar ratio of active halide (from the reactive organic halide) to Mg may be from preferably 1.5:1 to 5:1, more preferably from 1.5:1 to 3:1, most preferably from 1.9:1 to 3:1. The molar ratio of electron donor, if present, to Ti may be from 0.5:1 to 18:1, preferably from 1:1 to 15:1, most preferably from 2:1 to 12:1. The molar ratio of total Al (i.e., $Al^1+Al^2$):Mg in the catalyst or catalyst precursor may be from 0.35:1 to 3:1, preferably from 0.4:1 to 2:1.

Single Site Catalysts

The catalyst may be a single site type catalyst typically comprising a transition metal, preferably an early transition metal (e.g., Ti, V, Zr and Hf) and generally having two bulky ligands. In many of the well-known single site catalysts typically one of the bulky ligands is a cyclopentadienyl-type ligand. These cyclopentadienyl-type ligands comprise a $C_{5-13}$ ligand containing a 5-membered carbon ring having delocalized bonding within the ring and bound to the metal atom through covalent $\eta^5$ bonds which rings are unsubstituted or may be further substituted (sometimes referred to in a short form as Cp ligands). Cyclopentadienyl-type ligands include unsubstituted cyclopentadienyl, substituted cyclopentadienyl, unsubstituted indenyl, substituted indenyl, unsubstituted fluorenyl and substituted fluorenyl. An exemplary list of substituents for a cyclopentadienyl-type ligand includes the group consisting of $C_{1-10}$ hydrocarbyl radicals (including phenyl and benzyl radicals), which hydrocarbyl substituents are unsubstituted or further substituted by one or more substituents selected from the group consisting of a halogen atom, preferably a chlorine or fluorine atom; a $C_{1-4}$ alkyl radical; a $C_{1-8}$ alkoxy radical; a $C_{6-10}$ aryl or aryloxy radical; an amido radical which is unsubstituted or substituted by up to two $C_{1-8}$ alkyl radicals; a phosphido radical which is unsubstituted or substituted by up to two $C_{1-8}$ alkyl radicals; silyl radicals of the formula —Si—$(R)_3$ wherein each R is independently selected from the group consisting of hydrogen, a $C_{1-8}$ alkyl or alkoxy radical, and $C_{6-10}$ aryl or aryloxy radicals; and germanyl radicals of the formula Ge—$(R)_3$ wherein R is as defined directly above.

If there are two such bulky ligands (i.e., bis Cp) the catalysts are metallocene-type catalysts. The Cp ligand may be bridged to another Cp ligand by a silyl bridge or a short chain ($C_{1-4}$) alkyl radical. The Cp-type ligand may be bridged to an amido radical which may be further substituted by up to two additional substituents. Such bridged complexes are sometimes referred to as constrained geometry catalysts.

Broadly, the transition metal complex (or catalyst) suitable for use in the present invention has the formula:

$$(L)_n—M—(Y)_p$$

wherein M is a transition metal preferably selected from Ti, Hf and Zr (as described below); L is a monanionic ligand selected from the group consisting of a cyclopentadienyl-type ligand, a bulky heteroatom ligand (as described below) and a phosphinimine ligand (as described below); Y is an activatable ligand which is most preferably a simple monanionic ligand such as alkyl or a halide (as described below); n may be from 1 to 3, preferably 2 or 3; and p may be from 1 to 3, preferably 1 or 2, provided that the sum of n+p equals the valence state of M, and further provided that two L ligands may be bridged by a silyl radical or a $C_{1-4}$ alkyl radical.

If one or more of the L ligands is a phosphinimine ligand the transition metal complex may be of the formula:

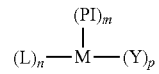

wherein M is a transition metal preferably selected from Ti, Hf and Zr (as described below); Pl is a phosphinimine ligand (as described below); L is a monanionic ligand selected from the group consisting of a cyclopentadienyl-type ligand or a bulky heteroatom ligand (as described below); Y is an activatable ligand which is most preferably a simple monanionic ligand such as an alkyl or a halide (as described below); m is 1 or 2; n is 0 or 1; and p is an integer fixed by the valence of the metal M (i.e. the sum of m+n+p equals the valence state of M).

In one embodiment, the catalysts are group 4 metal complexes in the highest oxidation state. For example, the catalyst may be a his (phosphinimine) dichloride complex of titanium, zirconium or hafnium. Alternately, the catalyst contains one phosphinimine ligand, one "L" ligand (which is most preferably a cyclopentadienyl-type ligand) and two "Y" ligands (which are preferably both chloride).

The preferred metals (M) are from Group 4, (especially titanium, hafnium or zirconium) with titanium being most preferred.

The catalyst may contain one or two phosphinimine ligands which are covalently bonded to the metal. The phosphinimine ligand is defined by the formula:

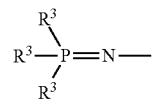

wherein each $R^3$ is independently selected from the group consisting of a hydrogen atom; a halogen atom; $C_{1-20}$, preferably $C_{1-10}$ hydrocarbyl radicals which are unsubstituted by or further substituted by a halogen atom; a $C_{1-8}$ alkoxy radical; a $C_{6-10}$ aryl or aryloxy radical; an amido radical; a silyl radical of the formula:

—Si—$(R^6)_3$ wherein each $R^6$ is independently selected from the group consisting of hydrogen, a $C_{1-8}$ alkyl or alkoxy radical, and $C_{6-10}$ aryl or aryloxy radicals; and a germanyl radical of the formula:

Ge—$(R^6)_3$ wherein $R^2$ is as defined above.

The preferred phosphinimines are those in which each $R^3$ is a hydrocarbyl radical, preferably a $C_{1-6}$ hydrocarbyl radical. A particularly preferred phosphinimine is tri-(tertiary butyl) phosphinimine (i.e., wherein each $R^3$ is a tertiary butyl group).

Preferred phosphinimine catalysts are Group 4 organometallic complexes which contain one phosphinimine ligand (as described above) and one ligand L which is either a cyclopentadienyl-type ligand or a heteroligand.

As used herein, the term "heteroligand" refers to a ligand which contains at least one heteroatom selected from the group consisting of boron, nitrogen, oxygen, phosphorus or sulfur. The heteroligand may be sigma or pi-bonded to the metal. Exemplary heteroligands include ketimide ligands, silicone-containing heteroligands, amido ligands, alkoxy ligands, boron hetrocyclic ligands and phosphole ligands, all as described below.

As used herein, the term "ketimide ligand" refers to a ligand which:

(a) is bonded to the transition metal via a metal-nitrogen atom bond;

(b) has a single substituent on the nitrogen atom (where this single substituent is a carbon atom which is doubly bonded to the N atom); and (c) has two substituents Sub 1 and Sub 2 (described below) which are bonded to the carbon atom.

Conditions a, b and c are illustrated below:

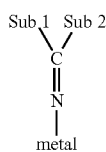

The substituents "Sub 1" and "Sub 2" may be the same or different. Exemplary substituents include hydrocarbyls having from 1 to 20 carbon atoms, silyl groups, amido groups and phosphido groups. For reasons of cost and convenience it is preferred that these substituents both be hydrocarbyls, especially simple alkyls and most preferably tertiary butyl.

Silicon containing heteroligands are defined by the formula:

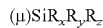

wherein the — denotes a bond to the transition metal and μ is sulfur or oxygen.

The substituents on the Si atom, namely $R_x$, $R_y$ and $R_z$ are required in order to satisfy the bonding orbitals of the Si atom. The use of any particular substituent $R_x$, $R_y$ or $R_z$ is not especially important to the success of this invention. It is preferred that each of $R_x$, $R_y$ and $R_z$ is a $C_{1-2}$ hydrocarbyl group (i.e., methyl or ethyl) simply because such materials are readily synthesized from commercially available materials.

The term "amido" is meant to convey its broad, conventional meaning. Thus, these ligands are characterized by (a) a metal-nitrogen bond and (b) the presence of two substituents (which are typically simple alkyl or silyl groups) on the nitrogen atom.

The terms "alkoxy" and "aryloxy" is also intended to convey its conventional meaning. Thus, these ligands are characterized by (a) a metal oxygen bond and (b) the presence of a hydrocarbyl group bonded to the oxygen atom. The hydrocarbyl group may be a $C_{1-10}$ straight chained, branched or cyclic alkyl radical or a $C_{6-13}$ aromatic radical which radicals are unsubstituted or further substituted by one or more $C_{1-4}$ alkyl radicals (e.g., 2,6 di-tertiary butyl phenoxy).

Boron heterocyclic ligands are characterized by the presence of a boron atom in a closed ring ligand. This definition includes heterocyclic ligands which also contain a nitrogen atom in the ring. These ligands are well known to those skilled in the art of olefin polymerization and are fully described in the literature (see, for example, U.S. Pat. Nos. 5,637,659 and 5,554,775 and the references cited therein).

The term "phosphole" is also meant to convey its conventional meaning. "Phospholes" are cyclic dienyl structures having four carbon atoms and one phosphorus atom in the closed ring. The simplest phosphole is $C_4PH_4$ (which is analogous to cyclopentadiene with one carbon in the ring being replaced by phosphorus). The phosphole ligands may be substituted with, for example, $C_{1-20}$ hydrocarbyl radicals (which may, optionally, contain halogen substituents); phosphido radicals; amido radicals; or silyl or alkoxy radicals. Phosphole ligands are also well known to those skilled in the art of olefin polymerization and are described as such in U.S. Pat. No. 5,434,116 (Sone, to Tosoh).

The term "activatable ligand" or "leaving ligand" refers to a ligand which may be activated by the alumoxane (also referred to as an "activator") to facilitate olefin polymerization. Exemplary activatable ligands are independently selected from the group consisting of a hydrogen atom; a halogen atom, preferably a chlorine or fluorine atom; a $C_{1-10}$ hydrocarbyl radical, preferably a $C_{1-4}$ alkyl radical; a $C_{1-10}$ alkoxy radical, preferably a $C_{1-4}$ alkoxy radical; and a $C_{5-10}$ aryl oxide radical; each of which said hydrocarbyl, alkoxy, and aryl oxide radicals may be unsubstituted by or further substituted by one or more substituents selected from the group consisting of a halogen atom, preferably a chlorine or fluorine atom; a $C_{1-8}$ alkyl radical, preferably a $C_{1-4}$ alkyl radical; a $C_{1-8}$ alkoxy radical, preferably a $C_{1-4}$ alkoxy radical; a $C_{6-10}$ aryl or aryloxy radical; an amido radical which is unsubstituted or substituted by up to two $C_{1-8}$, preferably $C_{1-4}$ alkyl radicals; and a phosphido radical which is unsubstituted or substituted by up to two $C_{1-8}$, preferably $C_{1-4}$ alkyl radicals.

The number of activatable ligands depends upon the valence of the metal and the valence of the activatable ligand. The preferred catalyst metals are Group 4 metals in their highest oxidation state (i.e., 4+) and the preferred activatable ligands are monoanionic (such as a halide—especially chloride, or $C_{1-4}$ alkyl—especially methyl). One useful group of catalysts contains a phosphinimine ligand, a cyclopentadienyl ligand and two chloride (or methyl) ligands bonded to the Group 4 metal. In some instances, the metal of the catalyst component may not be in the highest oxidation state. For example, a titanium (III) component would contain only one activatable ligand.

As noted above, one group of catalysts is a Group 4 organometallic complex in its highest oxidation state having a phosphinimine ligand, a cyclopentadienyl-type ligand and two activatable ligands. These requirements may be concisely described using the following formula for the preferred catalyst:

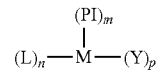

wherein: M is a metal selected from Ti, Hf and Zr; PI is as defined above, but preferably a phosphinimine wherein $R^3$ is a $C_{1-6}$ alkyl radical, most preferably a t-butyl radical; L is a ligand selected from the group consisting of cyclopentadienyl, indenyl and fluorenyl ligands which are unsubstituted or substituted by one or more substituents selected from the group consisting of a halogen atom, preferably chlorine or fluorine; $C_{1-4}$ alkyl radicals; and benzyl and phenyl radicals which are unsubstituted or substituted by one or more halogen atoms, preferably fluorine; Y is selected from the group consisting of a chlorine atom and $C_{1-4}$ alkyl radicals; m is 1; n is 1; and p is 2.

In one embodiment of the present invention, the transition metal complex may have the formula: $[(Cp)_qM[N=P(R^3)]_fY_g$ wherein M is the transition metal; Cp is a $C_{5-13}$ ligand containing a 5-membered carbon ring having delocalized bonding within the ring and bound to the metal atom through covalent $\eta^5$ bonds and said ligand being unsubstituted or up to fully substituted with one or more substituents selected from the group consisting of a halogen atom, preferably chlorine or fluorine; $C_{1-4}$ alkyl radicals; and benzyl and phenyl radicals which are unsubstituted or substituted by one or more halogen atoms, preferably fluorine; $R^3$ is a substituent selected from the group consisting of $C_{1-10}$ straight chained or branched alkyl radicals, $C_{6-10}$ aryl and aryloxy radicals which are unsubstituted or may be substituted by up to three $C_{1-4}$ alkyl radicals, and silyl radicals of the formula —Si—$(R^6)_3$ wherein $R^6$ is $C_{1-4}$ alkyl radical or a phenyl radical; Y is selected from the group consisting of a leaving ligand; q is 1 or 2; f is 1 or 2; and the valence of the transition metal—(q+f)=g.

The activator may be selected from the group consisting of:
  (i) an aluminoxane; and
  (ii) an activator capable of ionizing the transition (Group 4) metal complex (which may be used in combination with an alkylating activator).

The single site catalysts may be activated using alumoxanes. Alumoxanes have the formula $(R^4)_2AlO(R^4AlO)_mAl(R^4)_2$ wherein each $R^4$ is independently selected from the group consisting of $C_{1-20}$ hydrocarbyl radicals, m is from 3 to 50. Preferably m is from 5 to 30. Most preferably $R^4$ is selected from the group consisting of $C_{1-6}$, most preferably $C_{1-4}$ straight chained or branched alkyl radicals. Suitable alkyl radicals include a methyl radical, an ethyl radical, an isopropyl radical and an isobutyl radical. In some commercially available alumoxanes $R^4$ is a methyl radical.

The catalyst useful in accordance with the present invention may have a molar ratio of aluminum from the alumoxane to transition metal from 5 to 300:1, preferably from 25 to 200:1, most preferably from 50 to 120:1. Typically the alumoxane loading on the support will be from 1 to 40 weight % based on the (weight of the) support, preferably from 2 to 30 weight % based on the (weight of the) support, most preferably from 5 to 20 weight % based on the (weight of the) support. The corresponding loading of transition metal from the single site catalyst will be within the above specified ratio of Al:transition metal. Generally the loading of transition metal on the support will be from 0.01 to 5 weight % based on the (weight of the) support, preferably from 0.05 to 2 weight % of transition metal based on the (weight of the) support, most preferably from 0.1 to 1 weight % of transition metal based on the (weight of the) support.

An activator capable of ionizing the transition metal complex may be selected from the group consisting of:
  (i) compounds of the formula $[R^7]^+[B(R^8)_4]^-$ wherein B is a boron atom, $R^7$ is a cyclic $C_{5-7}$ aromatic cation or a triphenyl methyl cation and each $R^8$ is independently selected from the group consisting of phenyl radicals which are unsubstituted or substituted with from 3 to 5 substituents selected from the group consisting of a fluorine atom, a $C_{1-4}$ alkyl or alkoxy radical which is unsubstituted or substituted by a fluorine atom; and a silyl radical of the formula —Si—$(R^9)_3$; wherein each $R^9$ is independently selected from the group consisting of a hydrogen atom and a $C_{1-4}$ alkyl radical; and
  (ii) compounds of the formula $[(R^9)_tZH]^+[B(R^8)_4]^-$ wherein B is a boron atom, H is a hydrogen atom, Z is a nitrogen atom or phosphorus atom, t is 2 or 3 and $R^9$ is selected from the group consisting of $C_{1-8}$ alkyl radicals, a phenyl radical which is unsubstituted or substituted by up to three $C_{1-4}$ alkyl radicals, or one $R^9$ taken together with the nitrogen atom may form an anilinium radical and $R^8$ is as defined above; and
  iii) compounds of the formula $B(R^8)_3$ wherein $R^8$ is as defined above.

In the above compounds preferably $R^8$ is a pentafluorophenyl radical, and $R^7$ is a triphenylmethyl cation, Z is a nitrogen atom and $R^9$ is a $C_{1-4}$ alkyl radical or $R^9$ taken together with the nitrogen atom forms an anilinium radical which is substituted by two $C_{1-4}$ alkyl radicals.

The activator capable of ionizing the transition metal complex abstract one or more Y ligands so as to ionize the transition metal center into a cation but not to covalently bond with the transition metal and to provide sufficient distance between the ionized transition metal and the ionizing activator to permit a polymerizable olefin to enter the resulting active site. In short the activator capable of ionizing the transition metal complex maintains the transition metal in a+1 valence state, while being sufficiently liable to permit its displacement by an olefin monomer during polymerization.

Examples of compounds capable of ionizing the transition metal complex include the following compounds:
triethylammonium tetra(phenyl)boron,
tripropylammonium tetra(phenyl)boron,
tri(n-butyl)ammonium tetra(phenyl)boron,
trimethylammonium tetra(p-tolyl)boron,
trimethylammonium tetra(o-tolyl)boron,
tributylammonium tetra(pentafluorophenyl)boron,
tripropylammonium tetra(o,p-dimethylphenyl)boron,
tributylammonium tetra(m,m-dimethylphenyl)boron,
tributylammonium tetra(p-trifluoromethylphenyl)boron,
tributylammonium tetra(pentafluorophenyl)boron,
tri(n-butyl)ammonium tetra(o-tolyl)boron,
N,N-dimethylanilinium tetra(phenyl)boron,
N,N-diethylanilinium tetra(phenyl)boron,
N,N-diethylanilinium tetra(phenyl)n-butylboron,
N,N-2,4,6-pentamethylanilinium tetra(phenyl)boron,
di-(isopropyl)ammonium tetra(pentafluorophenyl)boron,
dicyclohexylammonium tetra(phenyl)boron
triphenylphosphonium tetra(phenyl)boron,
tri(methylphenyl)phosphonium tetra(phenyl)boron,
tri(dimethylphenyl)phosphonium tetra(phenyl)boron,
tropillium tetrakispentafluorophenyl borate,
triphenylmethylium tetrakispentafluorophenyl borate,
benzene (diazonium) tetrakispentafluorophenyl borate,
tropillium phenyltris-pentafluorophenyl borate,
triphenylmethylium phenyl-trispentafluorophenyl borate,
benzene (diazonium) phenyltrispentafluorophenyl borate,
tropillium tetrakis (2,3,5,6-tetrafluorophenyl) borate,
triphenylmethylium tetrakis (2,3,5,6-tetrafluorophenyl) borate,
benzene (diazonium) tetrakis (3,4,5-trifluorophenyl) borate,
tropillium tetrakis (3,4,5-trifluorophenyl) borate,
benzene (diazonium) tetrakis (3,4,5-trifluorophenyl) borate,
tropillinum tetrakis (1,2,2-trifluoroethenyl) borate,
triphenylmethylium tetrakis (1,2,2-trifluoroethenyl) borate,
benzene (diazonium) tetrakis (1,2,2-trifluoroethenyl) borate,
tropillium tetrakis (2,3,4,5-tetrafluorophenyl) borate,
triphenylmethylium tetrakis (2,3,4,5-tetrafluorophenyl) borate, and
benzene (diazonium) tetrakis (2,3,4,5-tetrafluorophenyl) borate.

Readily commercially available activators which are capable of ionizing the transition metal complexes include: N,N-dimethylaniliniumtetrakispentafluorophenyl borate; triphenylmethylium tetrakispentafluorophenyl borate; and trispentafluorophenyl boron.

If the transition (e.g., Group 4) metal complex is activated with a combination of an aluminum alkyl compound other than aluminoxane and a compound capable of ionizing the transition metal complex the molar ratios of transition metal:metal in the aluminum alkyl compound; metalloid (i.e., boron or phosphorus) in the activator capable of ionizing the transition metal complex (e.g., boron) may range from 1:0:1 to 1:10:5.

Chrome Catalysts

The chromium catalyst of the current invention is any chromium compound or mixture of compounds capable of polymerizing olefins and which can be deposited on the surface of a support or within a support. Minor amounts of a secondary metal species such as titanium and or aluminum compounds may also be incorporated together with the chromium compound. The chromium compound used can be any appropriate chromium salt or an inorganic or organic chromium compound. For example, chromocene (i.e., bis(cyclopentadienyl)chromium), silyl chromate and chromium oxide may be used. Preferably, the chromium compound is a chromium oxide or a silyl chromate compound.

The chromium oxide may be $CrO_3$ or any compound that is convertible to $CrO_3$ under oxidizing conditions. Examples of compounds that are convertible to $CrO_3$ under oxidizing conditions are disclosed in U.S. Pat. Nos. 2,825,721; 3,023,203; 3,622,251; and 4,011,382 and include but are not limited to chromic acetyl acetone, chromic chloride, chromic nitrate, chromic acetate, chromic sulfate, ammonium chromate, ammonium dichromate and other soluble salts of chromate.

The silyl chromate (i.e., silyl chromium) catalysts will have at least one group of the formula I:

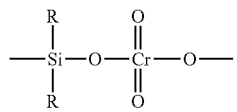

wherein R is a hydrocarbyl group having from 1 to 14 carbon atoms.

In a preferred aspect of the invention, the silyl chromate catalyst is a bis-trihydrocarbylsilylchromate having the formula II:

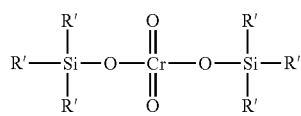

wherein R' is a hydrocarbyl group having from 1 to 14 carbon atoms. R' can independently be any type of hydrocarbyl group such as an alkyl, alkaryl, aralkyl or an aryl radical. Some non-limiting examples include methyl, ethyl, propyl, iso-propyl, n-butyl, iso-butyl, n-pentyl, iso-pentyl, t-pentyl, hexyl, 2-methyl-pentyl, heptyl, octyl, 2-ethylhexyl, nonyl, decyl, hendecyl, dodecyl, tridecyl, tetradecyl, benzyl, phenethyl, p-methyl-benzyl, phenyl, tolyl, xylyl, naphthyl, ethylphenyl, methylnaphthyl, dimethylnaphthyl, and the like. Illustrative of the preferred silylchromates but by no means exhaustive or complete of those that can be employed in this process are such compounds as bis-trimethylsilylchromate, bis-triethylsilylchromate, bis-tributylsilylchromate, bis-triisopentylsilylchromate, bis-tri-2-ethylhexylsilylchromate, bis-tridecylsilylchromate, bis-tri(tetradecyl)silylchromate, bis-tribenzylsilylchromate, bis-triphenethylsilylchromate, bis-triphenylsilylchromate, bis-tritolylsilylchromate, bis-trixylylsilylchromate, bis-trinaphthylsilylchromate, bis-triethylphenylsilylchromate, bis-trimethylnaphthylsilylchromate, polydiphenylsilylchromate, polydiethylsilylchromate and the like. Examples of bis-trihydrocarbylsilylchromate catalysts are also disclosed in U.S. Pat. Nos. 3,704,287 and 4,100,105.

The chromium based catalysts of the current invention are deposited onto an inorganic oxide support.

The amount of chromium catalyst added to the support should be sufficient to obtain between 0.01% and 10%, preferably from 0.1% to 3%, by weight of chromium, calculated as metallic chromium, based on the weight of the support.

Poor distribution of the liquid phase below the bed plate tends to result in poor distribution of the liquids above the bed plate. This may lead to a number of issues including flooding of the bed, the polymer particles in the flooded zone becoming swollen with solvent and becoming more sticky which in turn reduces the "sticking temperature" of the polymer particles leading to hot spots in the reactor and potentially sheet formation. Some of these problems may be exacerbated by the catalyst. If the polymers are "sticky" a hot catalyst (e.g., having a productivity of greater than 3,000 g of polymer per g of catalyst in some instances greater than 5000 g of polymer per g of catalyst) may be more prone to sheeting.

The Initial Model

There are a number of software applications available which are useful in the present invention. These include SolidWorks or Design Modeler for the creation and parametric manipulation of the flow geometry, ANSYS Mechanical for the calculation of material stress and ANSYS Fluent to determine the flow pattern, pressure drop and droplet trajectories and size distribution prediction used in calculating the objective function corresponding to a particular geometry.

A computer model of the reactor from the outlet of the heat exchanger to the top of the lowest product discharge port, including the inlet to the reactor head, the deflector plate, the bed plate and the reactor walls, is built. This provides a three dimensional finite model of the lower portions of the reactor and its internals. The model must include the internal flow passage of the recycle line, the deflector plate, the bed plate and the supporting structure below the bed plate (baffles) and the passages through the bed plate (bed plate hole arrangement and any cover member), the space above the bed plate to the top of the lowest discharge port, including a resistance to flow like a polymer bed or a model of a polymer bed. The model is then discretized into (filled with) cells, typically a minimum of 5,000,000 in some embodiments greater than 15,000,000 in further embodiments greater 20,000,000. To some extent this is dependent on the computing power available and how long it will take to run the simulation. There are a number of computer programs which may be used to build the original model such as, for example, Design Modeler or Gambit.

The model is first "initialized", and then the Navier-Stokes equations, along with other conservation equations (energy, temperature, mass, flow rate and momentum etc.), are solved iteratively at each cell of the model. For a given condition at the inlet of the recycle gas loop, the flow patterns within the recycle gas loop, reactor head and the first few feet of the reactor fluidized bed region are solved. The solution provides the distribution of the gas and liquid phases across the bed plate, velocity, temperature, pressure, liquid volume fraction, droplet size distribution, droplet breakage and coalescence rates, wall filming and re-entraining rates and the resulting droplet size distribution from the wall stripping events. The results are greatly dependent on the upstream conditions, and therefore, the recycle gas loop and the reactor geometries are necessary for an accurate model. The simulations are run to convergence in mass balance, local velocity, and liquid loading distribution across the bed plate.

Generally, the model is initialized using a flow of a gas at a temperature from 25° C. to 120° C. (preferably from 75° C. to 110° C.) and a pressure from 1700 kPa (250 psi) to 3445 kPa (500 Psi) (preferably 1800 kPa (260 psi) to 2400 kPa (350 psi) comprising monomers, ballast gas and from 3 to 35 wt. % of one or more ICA's having a density from 0.60 g/cc to 0.70 g/cc and an initial condition (e.g., inlet) droplet distribution as calculated using primary breakup correlations which typically may result in a droplet size from 25 microns up to 500 microns. The superficial gas flow rate through the reactor bed is sufficiently high to fluidize the bed (generally from 0.4 to 5 ft./s or 0.12 to 1.5 m/s, in some cases from 0.7 to 3.2 ft./second, or from 0.21 to 1.00 m/second).

Optionally, the modeling may also include liquid film formation zones where the liquid impinges on mechanical components of the reactor, which can lead to formation of larger droplets when the liquid is re-entrained due to the flow of gas in the modeled section of the reactor.

Then the model is run to calculate one or more of a) the flow pattern of the gases and liquids below the bed plate;

b) the change in the particle size distribution of the liquid phase due to: film formation, turbulent breakup of the film, and droplet coalescence due to the flow patterns created by the vertical baffles;

c) the flow pattern of gases, liquids, and polymer particles above the bed plate up to a distance of one half the diameter of the bed plate;

d) the height above the bed plate at which 80% of the droplets have evaporated;

e) liquid loading above the bed plate; and f) the propensity for liquid pooling above the bed plate.

These results are compared to flow patterns up to the bed plate in the transparent lab scaled model of the reactor.

Once the computer model has been validated as above then the calculations are repeated for different flow rates, internals (e.g., the baffle location and distribution etc.) and the same or a comparable composition of the inlet gas and liquid and the results recorded.

The recorded results are then compared (generally by computer) to determine operating conditions at which the condensed or liquid phase flows through the bed plate without biasing liquids across, either below or [immediately] above, the bed plate to select operating conditions at which there is no or a minimum of liquid accumulation below the bed plate, above the bed plate or both.

Then for a fixed (selected) flow rate one iteratively changes one or more of the composition of the inlet gas, the composition of the liquid and the loading of the liquid in the inlet gas and a) storing the calculated results; and b) comparing the stored results to determine one or more of a preferred composition of the gas phase; the composition of the liquid and the loading of the liquid phase in the gas phase (at the exit from the condenser).

The above conditions could be applied to the plant operation. Unfortunately while the operations may minimize pooling above or below the bed plate or both the operating conditions may result in a plant productivity level to be commercially unacceptable.

If a commercially useful result has not been obtained, then one iteratively changes one or more of the design of the bed plate and the design of the grid of baffles and a) storing the calculated results; and b) comparing the stored results to determine one or more of a preferred design for the bed plate and a design for the grid of baffles.

In some embodiments, all of the above iterative process steps are carried out to determine a preferred design of the bed plate, the supporting grid of baffles for the bed plate or both.

In the computer analysis of the plant operating conditions, it was noted almost immediately that if there was a raceway present (e.g., parallel walls traversing the bottom side of the bed plate with nothing to prevent flow of gas between the parallel walls to the edge of the reactor) there was a much higher propensity for liquid pooling above, or below the bed plate or both.

In modifying the surface below the bed plate, it was necessary to close off all open raceways to the edge of the bed plate. In some embodiments, there are multiple cells below the bed plate to uniformly distribute the gas from the inlet over the bottom surface of the bed plate. The grid below the bed plate is generally divided into a number of cells creating an array. The array of cells is centered about the center point of the bed plate. The cells may be of any shape, typically square, rectangular or a parallelogram (e.g. diamond shape). The outer wall of the reactor provides the outer wall of cells at the edge of the bed plate. These outer edge cells have a curved outer wall and are not strictly a square, rectangle or a parallelogram. Additionally, as the flow of gas through the inner annulus of the deflector plate is essentially directed to the lower surface of the bed plate, if the cells were all uniform the flow through the bed plate would not be uniform. There would be a stronger flow at the center of the bed plate. In some embodiments the cells are not of uniform size but rather are smallest at the center of the bed plate and are larger towards the outer edge of the bed plate.

The present invention is illustrated by the following non limiting example.

EXAMPLE

Figure 3:
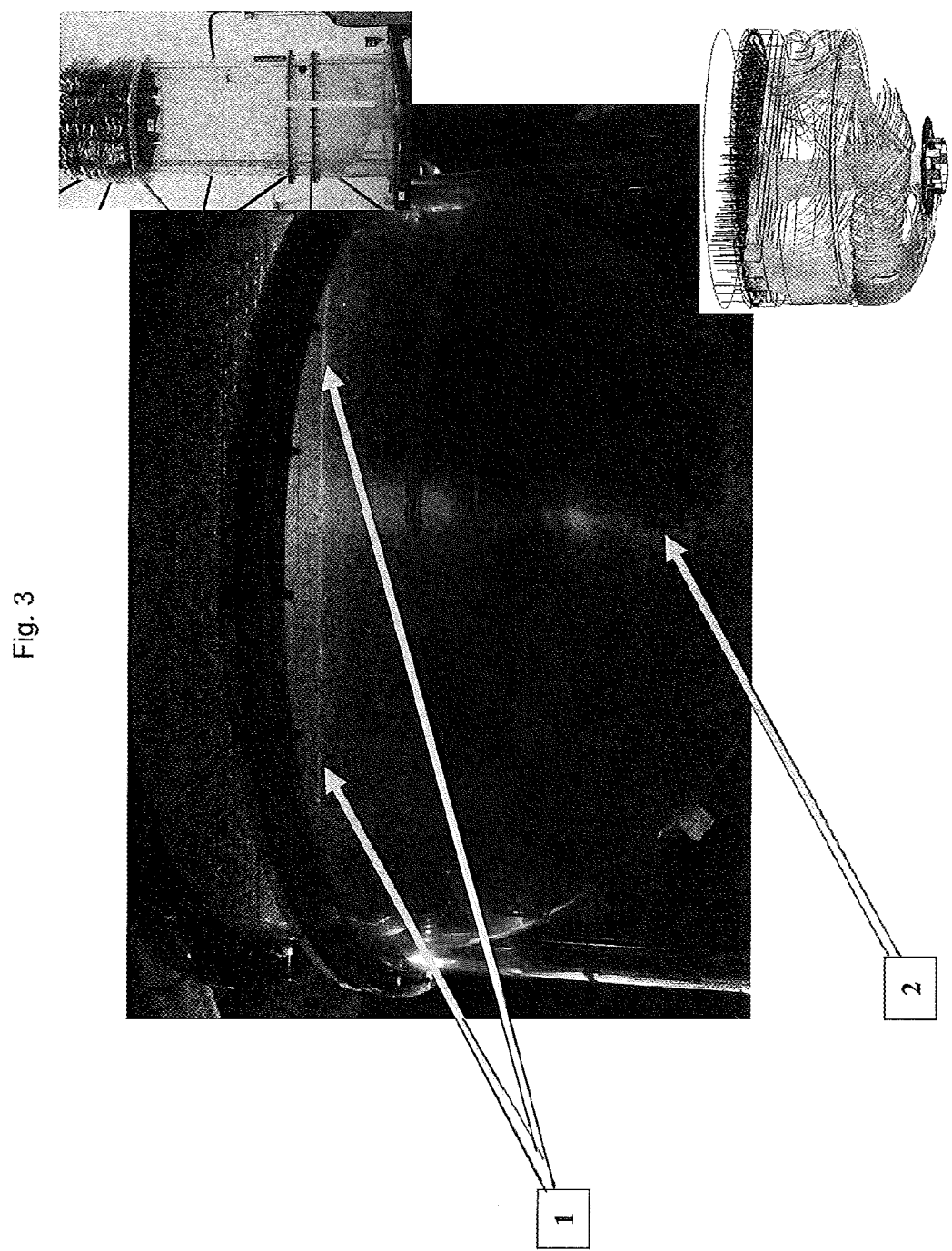
FIG. 3 is a photograph from the examples of light pulsed through a Plexiglas® model of the reactor having open raceways below the bed plate with an insert of the fluid dynamic flow pattern modeled in accordance with the present invention.

A computer model was made of the portion of an existing reactor from the outlet of the heat exchanger in the recycle line to the top of the lowest discharge vent. As noted above there were several "raceways" in the grid below the bed plate. The model showed that the flow pattern below the bed plate created by the "sweep" of the raceway flow hitting the reactor head walls and biasing opposite end of the raceway created a non uniform flow of gas and liquids through the bed plate with a high liquid loading near the product discharge valve. To confirm this, a Plexiglas® model of the computer modeled portion of the reactor having several open raceways below the bed plate was built. Air was passed through the Plexiglas model as the gas phase at a rate comparable to that used by the plant and modeled using the computer. A small amount of water (about 5 to 9 wt. %) was injected into the air flow in an amount to disperse the water as droplets. The gas and liquid flow rates were determined using mechanistic models and flow regime mapping techniques to scale the commercial fluid and liquid properties and flow rates and flow regime to laboratory air, water properties and flow rates and flow regime. A light beam was pulsed through the flow proximate the bed plate and the discharge valve at different angles to see the accumulation of water below and above the bed plate. FIG. 3 is a photo of the liquid accumulation and flow pattern.

Figure 4:
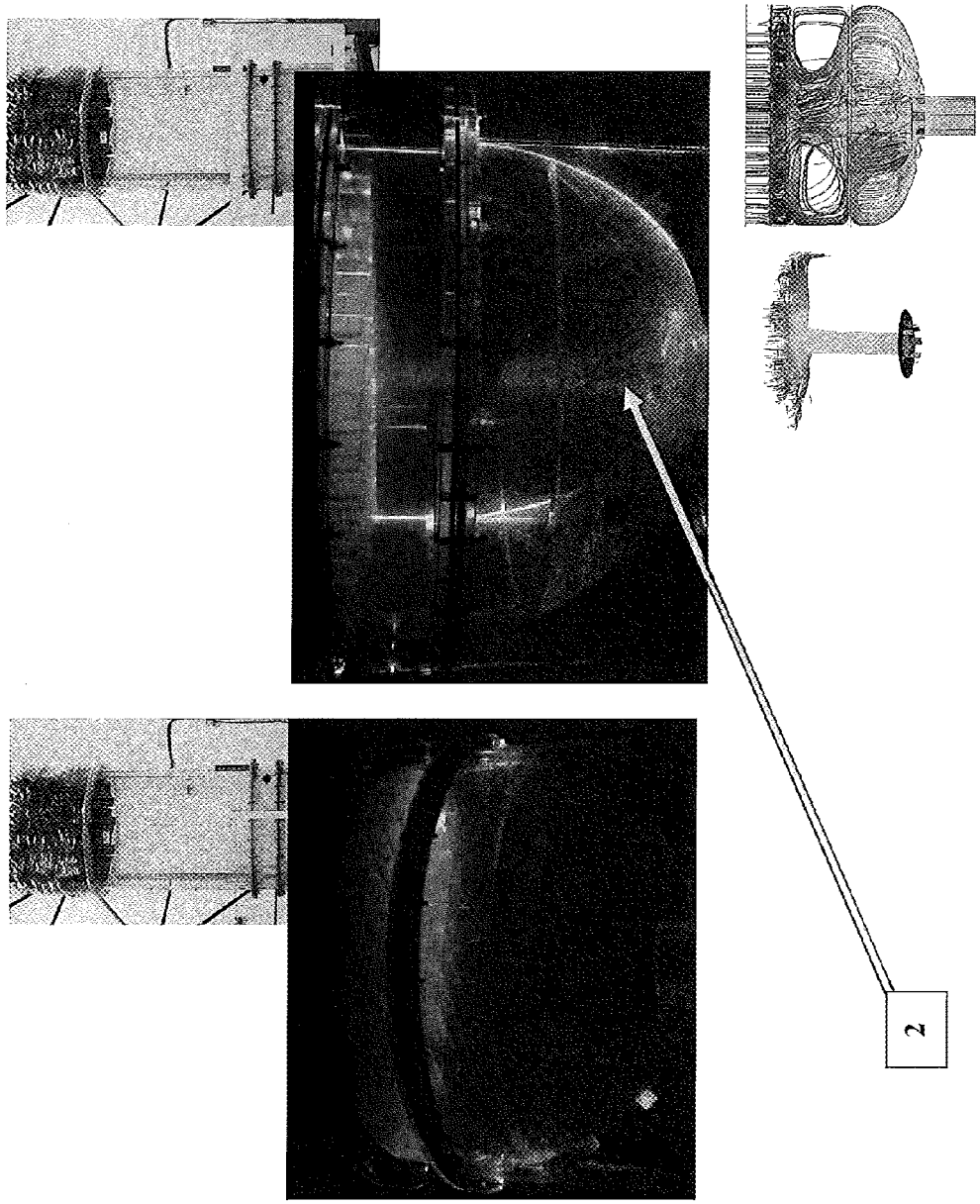
FIG. 4 is a photograph from the examples of light pulsed through a Plexiglas model of the reactor having diamond shaped cells below the bed plate with inserts showing the full Plexiglas model and the fluid dynamic flow pattern modeled in accordance with the present invention.

A modified grid, resulting from the computer modeling, comprising "diamond" shaped cells was then inserted into the Plexiglas model below the bed plate and the procedure was repeated. FIG. 4 is a photo of the liquid accumulation and flow pattern.

In FIGS. 3 and 4, like features are identified by like reference numbers. In FIG. 3, reference number 1 shows the accumulation of fluids along an open raceway. At the end of the race way there is also a light area showing the accumulation of fluids on the reactor wall below the distributor plate. In FIG. 3, reference number 2 shows the central jet from the distributor plate is angled, off perpendicular. These observations are consistent with the modeled flow pattern shown in the insert. In FIG. 4, there is no observable accumulation of fluids on the reactor wall below the bed plate. Also, the central jet from the distributor plate is vertical; it has not been deflected by internal lateral swirling of the flow below the bed plate. This is shown in the fluid dynamics modeling of the flow shown in the inserts.

The photos show the modified grid design generated by the computer modeling was effective to reduce liquid pooling below and above the bed plate in the region of the product discharge valve.

What is claimed is:

1. A method of operating a fluidized bed reactor in condensed mode having in cooperating arrangement a bed plate and a grid supporting a circular bed plate for a gas phase polymerization reactor having a fluidized bed of polymeric particles, a discharge port within half the diameter of the bed plate above the bed plate, said grid comprising a series of vertical baffles traversing the underside of the bed plate dividing the area below the bed plate into a series of cells so that from below the grid an upwardly directed jet comprising monomers, ballast gas and from 3 to 40 weight % of dispersed condensed hydrocarbons having a velocity sufficient to fluidize the bed, does not experience a raceway across the bed plate and a gas phase, and a condensed phase are substantially homogeneously distributed over not less than 80% of an area of available flow path through the bed plate, said method comprising on a computer:
i. modeling an operation of the reactor including:
a) building a three dimensional model of the reactor from an outlet of a heat exchanger to the top of a lowest discharge port, including a deflector plate, the bed plate having descending vertical baffles and a fluid zone representing the fluidized bed of polymer particles between the discharge port and the bed plate (hereinafter the modeled section of the reactor), and modeling a gas and liquid phase using Computational Fluid Dynamics software;
b) dividing the model into not less than 5,000,000 cells;
c) modeling the flow of a gas at a temperature from 25° C. to 120° C. and a pressure from 1700 kPa (250 psi) to 3445 kPa (500 Psi) comprising monomers, ballast gas and from 3 to 30 wt % of one or more condensed liquids having a density from 0.60 g/cc to 0.70 g/cc and an inlet normal droplet distribution from 25 to 500 microns through the modeled section of the reactor at a flow rate sufficient to fluidize the bed;
d) optionally modeling liquid film formation on zones where gas and liquid impinge on mechanical components of the reactor including walls, leading to formation of larger or smaller droplets
ii. determining one or more of:
e) a flow pattern of gas and liquid below the bed plate;
f) a change in the particle size distribution of the liquid phase due to impingement of the gas on mechanical components of the reactor including one or more of: filming formation, film stripping, turbulent breakup of droplets, and droplet coalescence due to flow patterns arising from the vertical baffles;
g) a flow pattern above the bed plate of gas, liquid(s) and polymer particles up to a distance of one half the diameter of the bed plate;
h) a height above the bed plate at which 80% of the droplets have evaporated;
i) a distribution of droplet size above the bed plate;
j) a propensity for liquid pooling above the bed plate; and
iii. iteratively repeating step ii) for different flow rates but the same composition of inlet gas and liquid loading and recording the results;
iv. comparing the results from step iii) to determine operating conditions at which liquid(s) flow through the bed plate without biasing liquids across, and either below or immediately above, the bed plate.

2. The method according to claim 1, further comprising iteratively varying one or more of the composition of the inlet gas, the composition and loading of liquid in the inlet gas,
storing the calculated results; and
comparing the stored results to determine one or more of a preferred composition of the gas phase, the composition of the liquid and the loading of the liquid.

3. The method according to claim 1 further comprising iteratively varying the design of the grid,
storing the calculated results; and
comparing the stored results to determine one or more of a preferred design for the grid.

4. The method according to claim 1, wherein the monomers comprise not less than 70 wt % ethylene and up to 30 wt % of one or more $C_{4-8}$ alpha olefins.

5. The method according to claim 1, wherein an induced condensing agent is present in an amount to provide from 3 to 40 wt % of liquids based on the weight of a recycle gas flow at a reactor inlet and comprises a non-polymerizable hydrocarbon or fluorocarbon.

6. The method according to claim 5, wherein the operating conditions in step i c) for the reactor are at a temperature from 75° C. to 110° C. and a pressure from 1800 kPa (260 psi) to 2400 kPa (350 psi).

* * * * *